United States Patent [19]

Thompson et al.

[11] Patent Number: 5,039,317

[45] Date of Patent: Aug. 13, 1991

[54] RADIAL INFLOW PARTICLE SEPARATION METHOD AND APPARATUS

[75] Inventors: Craig E. Thompson, Gilbert; Walter L. Blackmore, Tempe, both of Ariz.; Walid M. Boulos, Beverly, Mass.; Marc Schmittenberg, Phoenix; Yogendra Sheoran, Scottsdale, both of Ariz.

[73] Assignee: Allied-Signal Inc., Morris Township, Morris County, N.J.

[21] Appl. No.: 548,047

[22] Filed: Jul. 5, 1990

[51] Int. Cl.$^5$ ............................................. B01P 45/12
[52] U.S. Cl. .......................................... 55/1; 55/306; 55/394; 60/39.092
[58] Field of Search ................. 55/1, 15, 17, 306, 394, 55/401, 467; 60/39.092

[56] References Cited

U.S. PATENT DOCUMENTS

| | | |
|---|---|---|
| 3,371,471 | 3/1968 | Connors . |
| 3,402,881 | 9/1968 | Moore et al. . |
| 3,521,431 | 7/1970 | Connors et al. . |
| 3,534,548 | 10/1970 | Connors . |
| 3,546,681 | 12/1970 | Brown . |
| 3,751,907 | 8/1973 | Anderson ..................... 60/39.092 |
| 3,766,719 | 10/1973 | McAnally, III . |
| 3,785,128 | 1/1974 | Redemann . |
| 3,970,439 | 7/1976 | Murphy . |
| 3,977,811 | 8/1976 | Kuintzle, Jr. . |
| 4,509,962 | 4/1985 | Breitman et al. . |
| 4,527,387 | 7/1985 | Lastrina et al. . |
| 4,685,942 | 8/1987 | Klassen et al. . |

FOREIGN PATENT DOCUMENTS 141777 1/1935 Fed. Rep. of Germany .
758530 10/1956 United Kingdom .

OTHER PUBLICATIONS

Design Guide for Integral Engine Inlet Particle Separator, Aug. 1975.

*Primary Examiner*—Charles Hart
*Attorney, Agent, or Firm*—Terry L. Miller; James W. McFarland; Robert A. Walsh

[57] ABSTRACT

A radial inflow particle separator includes a pair of axially and radially spaced curvilinear walls cooperatively defining a circumferential flow path leading radially inwardly and axially to an engine. Preferably, the particle separator is employed with a turbine engine which is operated at times in an environment laden with dust and particulate matter. Such an environment is typically encountered by a turbine engine of a helicopter, or off-road vehicle. The particle separator provides dust and particulate control features including aero-inertial, particle trajectory, particle boundary-rebound, and scavenge flow tailoring to achieve a dust and particulate separation efficiency as good as or better than the best conventional axial-flow particle separators. This particle separation effectiveness is achieved in a radial inflow particle separator which is smaller and lighter in weight than axial flow devices, and which packages advantageously with the essential structures of a turbine engine.

40 Claims, 5 Drawing Sheets

RADIAL INFLOW PARTICLE SEPARATION METHOD AND APPARATUS

The U.S. Government has rights in this invention in accord with the provisions of Contract No. DAAJ02-86-C-0006, issued by the U.S. Army.

This invention is in the field concerned with the removal of dust, sand, and other particulates from a flow of ambient air. More particularly, the present invention is concerned with the removal of fine dust and particulates from the inlet air stream of a mobile turbine engine without the use of heavy structures or filter media, the latter of which may clog under severely dusty conditions. In industrial applications employing stationary structures, an initial air cleaning is frequently achieved by the use of large cyclone-type devices. Filter bags or panel filter media may then remove additional particulates from the inlet air flow. However, a mobile turbine engine of, for example, a helicopter, aircraft ground starting cart, or mobile electrical generator set cannot be fitted with a massive and heavy dust separator. On the other hand, these mobile uses of a turbine engine in unprepared circumstances are precisely those which frequently expose the engine to the most adverse dusty operating conditions.

In view of the above, it is easily appreciated that the search has been long and exhaustive for a dust and particulate separator for the inlet of turbine engines which is small, light weight, imposes only a small pressure drop, and yet very effective. An example of a panel-type particle separator is provided by U.S. Pat. No. 3,970,439, issued July 20, 1976, to Joseph P. Murphy, (hereinafter, the '439 patent). The panel separator of the '439 patent is composed of a plurality of identical side-by-side channels. Separation of particulate matter is asserted to be achieved by accelerating the particles to a high velocity in the air stream, then bending the air stream so that the particles are carried straight by their own inertia into a capture area. Particulate material from the capture area is exhausted overboard. The inlets to the particle capture areas are configured to guide bouncing particles into capture rather than into the engine air stream.

However, the panel-type filter in general does not package well with the structures of a turbine engine. Viewing the drawing figures of the '439 patent will quickly illuminate how the rectangular prismatic structure of the panel filter conflicts with the essential structures of a turbine engine. These essential structures generally are cylindrical and are axially stacked. Additionally, the panel filter of the '439 patent is believed to operate best with inlet air flow vertically downward into the panel. This requirement imposes a severe restraint on installation of a turbine engine with a panel filter according to the '439 patent. Also, the panel type filter requires a bypass duct and valve member which can be opened in icing conditions. Otherwise severe icing can obstruct or shed in large chunks from a panel type particle separator.

An alternative avenue of approach to the problem of removing dust and particulate matter from air flow to a turbine engine, that of manipulating an axially flowing annulas of air, is presented in the technical paper entitled Integral Engine Inlet Particle Separator, Volume II—Design Guide, prepared by General Electric Company, for the U.S. Army Air Mobility Research and Development Laboratory at Fort Eustis, Virginia, identified by document number USAAMRDL-TR-75-31B, dated Aug. 1975, at pages 20, and 68-79. Also of interest are U.S. Pat. Nos. 3,766,719, issued Oct. 23, 1973, to William Jr. McAnally, III; 3,977,811, issued Aug. 31, 1976, to Charles Kuintyle, Jr.; 4,509,962, issued Apr. 9, 1985, to Daniel S. Breitman, et al; 4,527,387, issued July 9, 1985, to Frank A. Lastrina, et al; and 4,685,942, issued Aug. 11, 1987, to David D. Klassen, et al., (hereinafter, the '719; '811; '962; '387; or '942 patent. The technical paper and patents present an interesting chronology of the development of the axial flow inlet particle separator. This type of particle separator is now generally considered to be the industry standard, and finds wide application, particularly to helicopter propulsion turbine engines.

Generally speaking, the conventional axial flow inlet particle separator achieves particle separation by various combinations of aero-inertia effects (swirl, radial, and axial superimposed accelerations), particle trajectory control, particle boundary rebound prediction, and scavenge air flow control. The particular combination of these effects which is used varies from design to design. However, the best conventional axial flow particle separators generally achieve 95% effectiveness with MIL STD 5007-C spec sand (0–1000$\mu$) and 85% effectiveness with A.C. course (0–200$\mu$) particulate material.

Unfortunately, the best conventional axial flow inlet particle separators still exact a price in terms of installed weight and size, in particular, adding considerably to the axial length of the turbine engine installation. This is easily appreciated by considering the drawing Figures of the '719; or '962, patents. Because all or a portion of the turbine engine is depicted, an appreciation can be gained of the increment of axial length added by an axial flow separator sized to accommodate the inlet air flow of a typical turbine engine. As can be seen, this increment of added length may be 20% to 50%, or more, of the length of the turbine engine itself. The added weight of these axial flow particle separators is also significant.

An alternative avenue of approach to the problem of separating dust and particulates from the inlet air flow of a turbine engine is presented by U.S. Pat. Nos. 3,371,471, and 3,521,431, issued Mar. 5, 1968, and July 21, 1970, respectively, to H. D. Connors, et al, (hereinafter, the '471; or '431 patents). The teachings of the Connors, et al., patents are believed to show a particle separator having a pair of curvilinear walls spaced apart axially and radially to bound an annular inlet flow path extending radially inwardly and axially to the engine inlet. Primarily in response to centrifugal force or, more properly, particle inertia, the air flow follows the curving flow path while the particulates are directed against the outer one of the walls with respect to curvature of the flow path. A separator lip collects the particles along with a carrier air stream apart from the inlet air stream. The particulates in the carrier air stream are then collected in a chamber and most of the carrier air stream is directed to the engine inlet.

Except for the structure for separating the particulates from the carrier air stream and for collecting the particulates, the particle separator of Connors, et al., would package very well with the essential structures of a turbine engine. However, when considered in its totality, the particle separator of Connors, et al., is nearly as bulky as conventional axial flow particle separators.

Of greater importance, however, is the disappointingly low effectiveness of particulate separation achieved by the separators of Connors, et al. This low overall effectiveness is compounded by a tendency toward circumferentially non-uniform separation effectiveness, particularly with particulates in a certain size and weight range. For example, the upper quadrant of the separator may achieve acceptable separation of particulates flowing downwardly into the separator. However, the lower separator quadrant, where the gravitational vector is opposite in its effect on the particulates and their hoped-for movement to the one separator wall, may have very poor separation performance.

While the aggregate separation efficiency achieved by a separator as taught by Connors, et al., may be marginally acceptable on a percentage basis, the mentioned circumferential nonuniformity of separation may be very damaging to a turbine engine. That is, containing the above example, air flow from the lower separator quadrant may flow to the turbine engine carrying a fairly heavily-concentrated load of particulates. This particulate-laden air flow from the lower separator quadrant does not distribute circumferentially so that the engine structure is exposed to damage only from the average particulate loading. Instead, the particulate laden air remains concentrated, continually impacts upon a certain portion of the engine static structure, and severely erodes this portion of the structure. Also, the rotating structure, particularly the first compressor stage, encounters the concentrated stream of particulates with each rotation. Because structural abrasion, erosion and deterioration are not necessarily linear functions of particulate exposure, but may be complex interactive functions, the rotating structure of the engine may be damaged by the concentration of particulates beyond what would be expected. That is, the concentrated stream of particulates may be far more damaging to the engine structure than would the same load of particulates uniformly distributed in the inlet air flow. The applicants believe that the radial inflow particle separators of Connors, et al., have achieved only limited acceptance.

In view of the deficiencies of conventional radial-flow particle separators, it is an object for this invention to provide a compact, highly effective radial inflow particle separator which packages well with the essential structures of a turbine engine, and which avoids circumferential nonuniformity of particle separation.

To this end, the applicants have constructed prototype radial inflow particle separators using design parameters from the best conventional axial flow particle separators. There prototype separators were disappointing in their performance, and in fact did not achieve separation efficiencies matching the axial flow devices discussed above and the design parameters of which were used in the prototypes. The prototype separators were more compact than those taught by Connors, et al., but also were only about equivalent in performance.

It is believed by the applicants that, in large part, the differences in operation between axial flow and radial inflow separators, even when built to the same design parameters, derives from the inherent area decrease and resulting air flow acceleration with radial inflow in the device. Also, air flow swirling vanes, as taught by the '811, and '387 patents, which apply a radially outward centrifugal acceleration to the air flow in order to fling particulates therein toward a capture zone, are not a possibility with a radial inflow particle separator. The use of these swirl vanes can be a detriment to a separator because they catch ingested foliage, which may clog the engine inlet, and they also can accumulate and shed ice chunks during icing conditions.

Thus, the present invention provides a radial inflow particle separator comprising an axially and radially spaced apart pair of walls cooperatively defining therebetween an annular air flow path leading radially inwardly from an ambient inlet and then turning axially to an outlet, an annular radially and axially extending splitter member interposing axially and radially between said pair of walls substantially at the turning of said flow path and cooperating with one of said pair of walls to separate from said flow path a scavenge flow path having an annular inlet confronting said ambient inlet, said pair of walls each including a respective annular axially extending prominence spaced radially from the prominence of the other of said pair of walls, and said axial prominences cooperating to bound a line of sight radially into said particle separator, said line of sight at its radially inner limit being entirely within said scavenge flow path inlet.

According to another aspect of the present invention, a radial inflow particle separator comprises radial inflow particle separation apparatus associating with a turbine engine and removing air-bourne particulates from an ambient air stream to thereby provide an engine inlet air stream substantially free of said particulates, said particle separation apparatus comprising a pair of annular wall members axially spaced apart to cooperatively define both an annular ambient inlet and a flow path proceeding radially inwardly between said pair of walls; a first of said pair of walls defining a respective annular radially outer axial prominence at said ambient inlet and a concave radially inwardly extending first surface portion slanting in a first axial direction below said prominence to bond said ambient flow path; a second of said pair of walls defining a respective convex annular radially outer second surface portion cooperating with said first surface portion to define said ambient inlet and slanting in said first axial direction to bond said ambient flow path, said second surface portion defining a respective second annular radially inner axial prominence spaced inwardly of and extending axially in opposition to said first axial prominence, said second surface portion cooperating with said first surface portion generally at said second axial prominence to define an annular throat for said particle separation apparatus; radially inwardly of said throat said first surface portion slanting opposite said first axial direction and joining with a third surface portion defined by said first wall member, said third surface portion being convex to proceed radially inwardly from said first surface portion while curving substantially to the first axial direction; an annular splitter member in axial and radially inwardly spaced relation with said first wall member at said third surface portion to cooperatively define both a radially outwardly disposed annular scavange inlet in general radial congruence with said throat and a scavange flow path proceeding from said scavange inlet radially inwardly while curving substantially to the first axial direction; radially inwardly of said throat said second surface portion curving toward the opposite axial direction to diverge from said first surface portion and to define a recess extending axially in said opposite axial direction below said second axial prominence, at said recess said second wall member defining a forth concave surface portion joining with said second surface portion and extending radially inwardly while curving substantially to the first axial direction in axial and radially inwardly spaced relation with said splitter member to define an engine inlet flow path; said splitter member being received into said axial recess so that said scavange inlet at the extent thereof defined by said splitter member is spaced axially opposite said first direction with respect to said throat, and a line surface portion of said splitter member whereat air flow into said scavange inlet separates from air flow into said engine inlet flow path is hidden from a radially inward line of sight by said axial prominences; whereby particulates injested into said ambient air inlet proceed radially inwardly through said throat and into said scavange inlet along with a scavange fractional flow of air, said engine inlet air stream turning into said axial recess substantially free of particulates and proceeding to said turbine engine via said engine inlet flow path.

An advantage of the present invention resides in its combination of aero-inertial, particle trajectory, boundary rebound, and scavange flow tailoring elements in view of the inherent flow acceleration of a radial inflow device to achieve very high and circumferentially uniform particle separation without preswirl vanes at the inlet to the particle separator.

These and other advantages of the present invention will be apparent from a reading of the following detailed description of a single preferred embodiment of the invention taken in conjunction with the appended drawing figures, in which:

Figure 1:
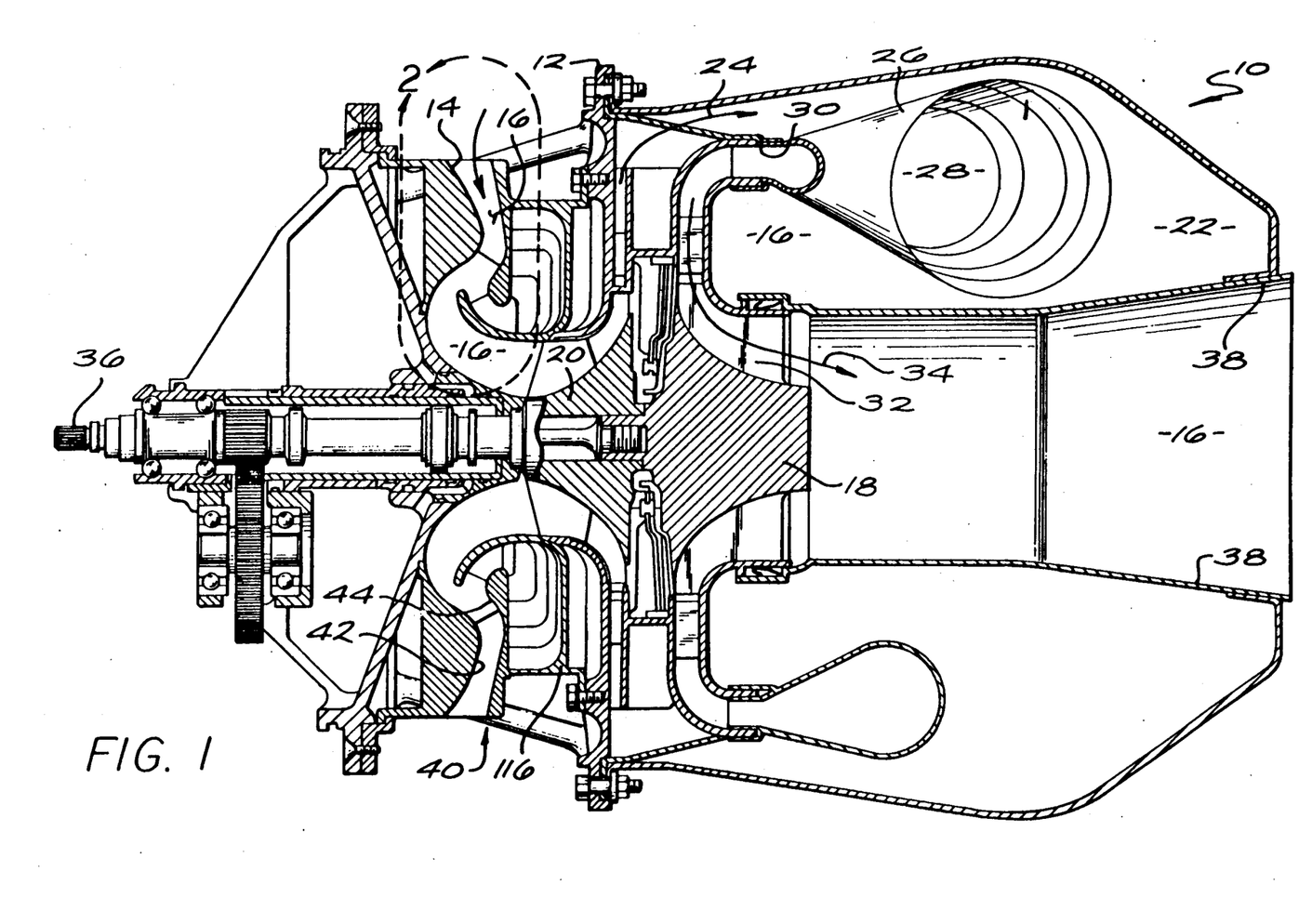
FIG. 1 provides a longitudinal view, partly in cross section of a turbine engine including a radial inflow particle separator embodying the present invention.

Viewing FIG. 1, a turbine engine 10 includes a housing 12. The housing 12 defines an annular inlet 14, which is substantially continuous circumferentially, and which opens radially inwardly from ambient to a flow path 16. A rotor member, generally referenced with the numeral 18 is journaled in the housing 12, and cooperates therewith to bound the flow path 16.

The flow path 16 first leads to a compressor rotor portion 20 of the rotor member 18. Rotation of the rotor member 18 causes the compressor rotor portion 20 to induct ambient air via the inlet 14, and to deliver this air pressurized to a pressurized air plenum portion 22 of the flow path 16, as is depicted by air flow arrows 24. A combustor structure 26 (only a portion of which is visible in FIG. 1) is disposed in the pressurized air plenum 22. Pressurized air from the plenum 22 flows through perforate portions of the combustor structure 26 into a combustion cavity 28 there to be mixed with fuel to sustain combustion.

Thus, it is seen that the combustor structure 26 defines a part of the flow path 16, and the pressurized high-temperature combustion products produced therein flow via a combustor exit 30 to a turbine rotor portion 32 of the rotor member 18, as depicted by arrows 34. The turbine rotor portion 32 expands the combustion products toward ambient to extract mechanical power therefrom. Turbine rotor portion 32 drives the rotor member 18, including both the compressor rotor portion 20, and a protruding power output shaft portion 36 thereof. From the turbine rotor portion 32, the combustion products flow via a concluding portion of the flow path 16, and are exhausted to ambient via an outlet 38.

Figure 2:
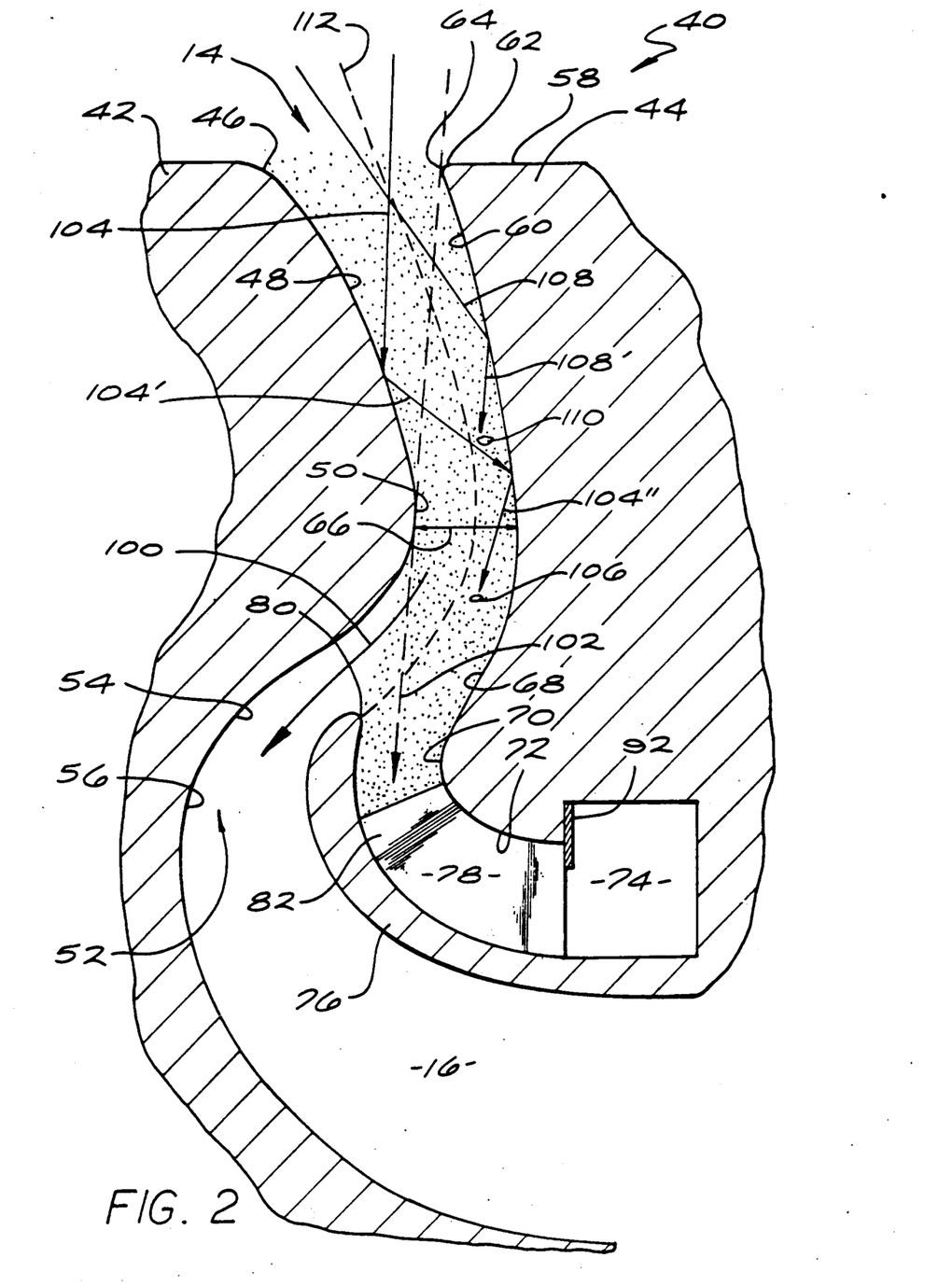
FIG. 2 depicts an encircled portion of FIG. 1 which is enlarged in size and somewhat schematic to better illustrate salient features of the preferred embodiment of the invention.

Viewing now FIG. 2, an encircled portion of the turbine engine 10 of FIG. 1 is depicted both enlarged in size and somewhat schematically to better illustrate salient details of the structure. More particularly, the turbine engine 10 includes structure defining a radial inflow inlet particle separator (IPS), generally referenced with the numeral 40. The IPS 40 defines the inlet 14 and initial parts of the flow path 16 preceeding compressor rotor portion 20. In greater detail, the IPS 40 includes a pair of axially and radially spaced wall portions 42, 44 of the housing 12. The walls 42, 44 cooperatively define the initial part of the flow path 16 leading radially inwardly from inlet 14.

Proceeding radially inwardly from the inlet 14, the wall 42 defines an axially convex surface portion 46 leading axially and radially inwardly to a generally radially extending and slightly axially convex surface portion 48. The wall 42 continues radially inwardly from convex portion 48 in a radially extending axially convex surface portion 50 which reverses the axial direction of the wall 42. That is, the surface portion 50 of wall 42 defines an axial prominence protruding toward the wall 44. Further, the wall portion 50 leads into a recess or concavity, generally referenced with the numeral 52, and introduces a recurve into the wall 42. From the wall surface portion 50, wall 42 defines a surface portion 54 extending radially inwardly and axially into the recess 52. Radially inwardly of the surface portion 54, the wall 42 reverses its direction of curvature in cross section, and in a surface portion 56 is axially concave. The axially concave surface portion 56 of wall 42 continues radially inwardly and turns from the radial direction to proceed axially and to bound the radially inner extent of flow path 16 at the inducer of compressor rotor portion 20.

Extending in axially spaced and confronting relation with the wall 42, the wall 44 includes an axially extending radially outwardly disposed surface portion 58. The surface portion 58 cooperates with a radially extending generally concave or conical surface portion 60 to define a circumferentially continuous axial prominence 62. The prominence 62 is disposed radially outwardly of prominence 50 of the wall 42, and extends in the opposite axial direction. At the prominence 62, the wall 42 defines a relatively sharp blend radius, which is generally referenced with the numeral 64. The surface portion 60 extends radially inwardly and axially with a gradual concave curvature to cooperate at arrow 66 with the wall 42 in defining an annular throat. That is, at the annular throat referenced with arrow 66, the walls 42 and 44 cooperatively define the minimum cross sectional area of flow path 16 which is available for radial inflow of air in the separator 40.

Radially inwardly of the throat 66, the wall 44 includes a surface portion 68 extending radially and curving axially in a direction opposite to the axial concavity of wall surface portion 66. In other words, the surface portion 68 curves axially out of the axial recess defined by surface portion 64. Also, downstream of throat 66, the surfaces 54 and 68 axially diverge to increase the flow area of flow path 16 despite the radially inward flow direction. At 70 the surface of wall 44 reverses in curvature to introduce a recurve, and the surface portion 72 of wall 44 leads generally axially into a scavenge cavity 74, as is further explained below.

In the region of recess 52, a radially and axially extending annular splitter member, generally referenced with the numeral 76, is disposed in spaced relation between the walls 42 and 44. The splitter member 76 generally confronts the surface portions 54 and 56 of wall 42 to locally bound the flow path 16 in cooperation therewith. Also, the splitter member 76 confronts the surface portions 70 and 72 of the wall 44 to bound a radially inwardly and axially extending scavenge flow path, which is referenced with the numeral 78, and which communicates with the scavenge cavity 74.

The splitter member 76 includes an annular surface line portion, or splitter line, referenced with the numeral 80, confronting the inlet 14 and air flow entering via the flow path 16. The line surface portion 80 designates the line of demarcation whereat air flow continuing in the path 16 separates from air flow continuing via flow path 78 into scavenge cavity 74. Downstream of the splitter line 80, an annularly arrayed plurality of scavenge flow turning vanes 82 extend axially between wall 44 and the splitter member 76. The vanes 82 connect axially and radially between the wall 44 and splitter member 76, and extend from a position spaced downstream of the splitter line 80 toward the scavenge cavity 74 with a circumferential curvature. The vanes 82 turn air flow in flow path 78 from a radially inward and axial direction to a circumferential direction for introduction to cavity 74.

Figure 5:
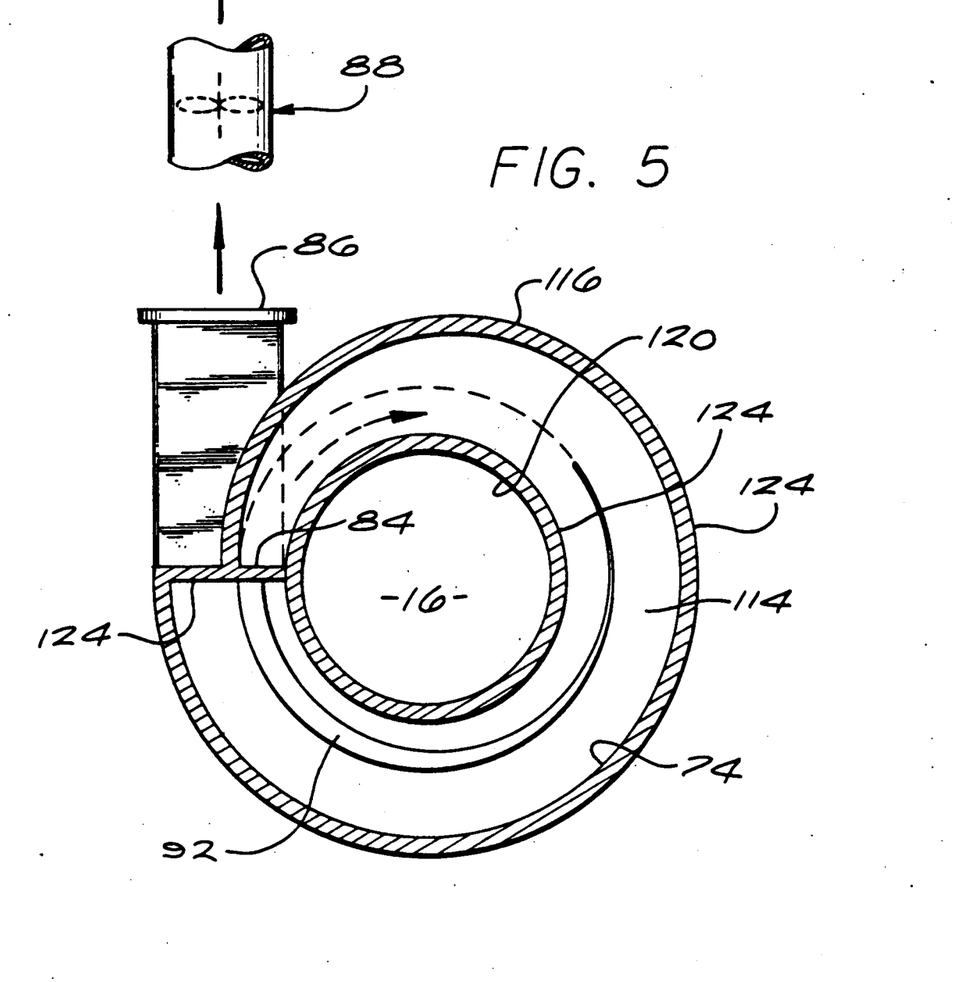
FIG. 5 is an isolated partially cross sectional view of a component part of the preferred embodiment of the invention.
Figure 6:
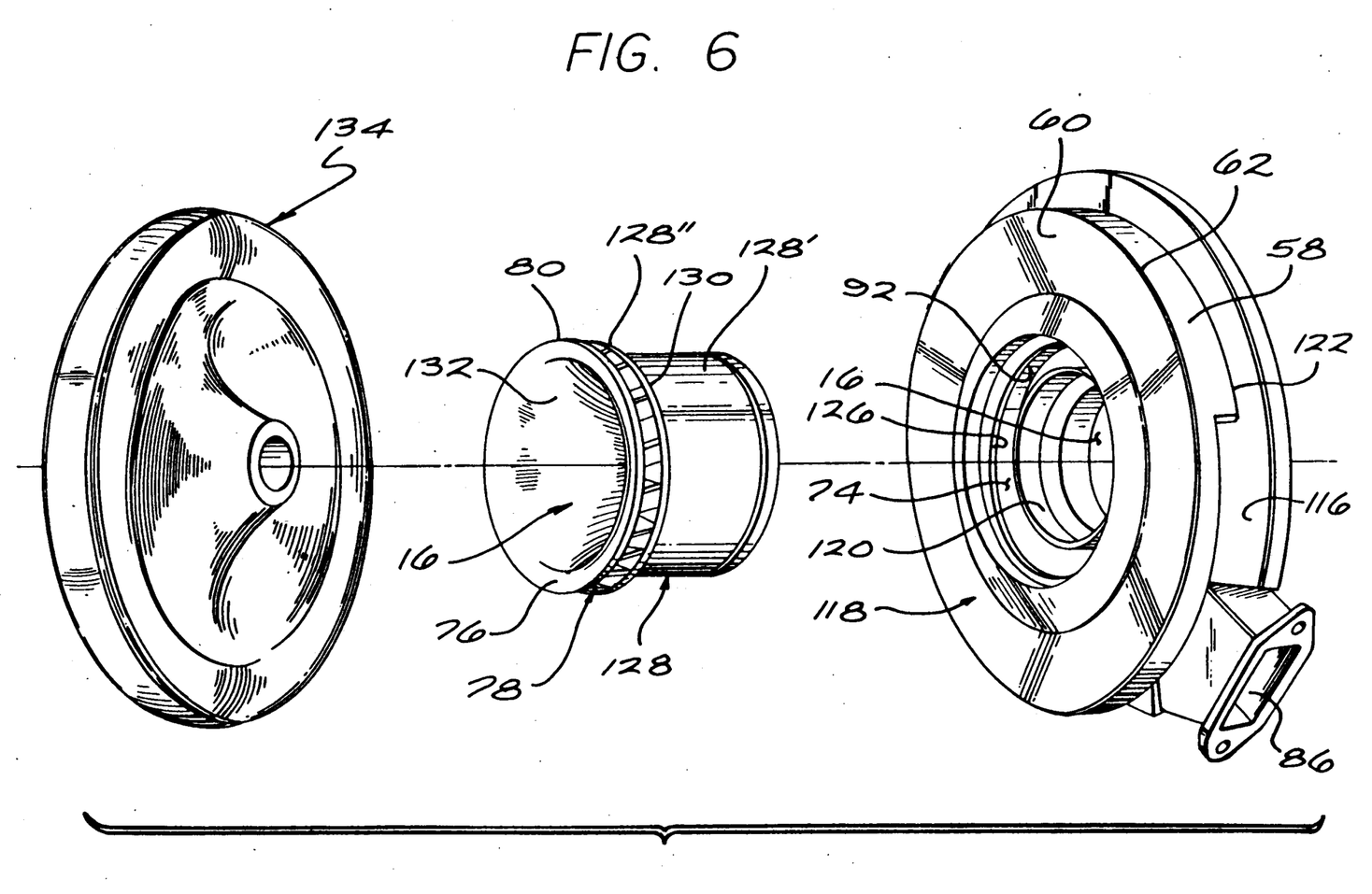
FIG. 6 provides an exploded perspective view of component parts of the preferred embodiment of the invention.

Viewing FIGS. 5 and 6 in conjunction, it will be seen that the scavenge cavity 74 is in fact scroll-shaped. That is, the cavity 74 extends circumferentially about the flow path 16 with increasing axial depth and radial dimension to provide increasing cross sectional flow area from an end 84 to a scavenge conduit exit 86. The exit 86 is radially aligned generally with the end 84 and is radially outward thereof. The scavenge cavity 74 thus provides substantially complete circumferential communication from the scavenge flow path 78 to conduit exit 86, while providing for substantially uniform distribution of scavenge air flow. The scavenge conduit exit 86 communicates with a scavenge blower or aspirator 88, as is schematically depicted viewing FIG. 5. The scavenge aspirator 88 is driven by the engine 10 and operates at all times during operation of the engine to withdraw a predetermined fraction of the air flow entering inlet 14.

Figure 3:
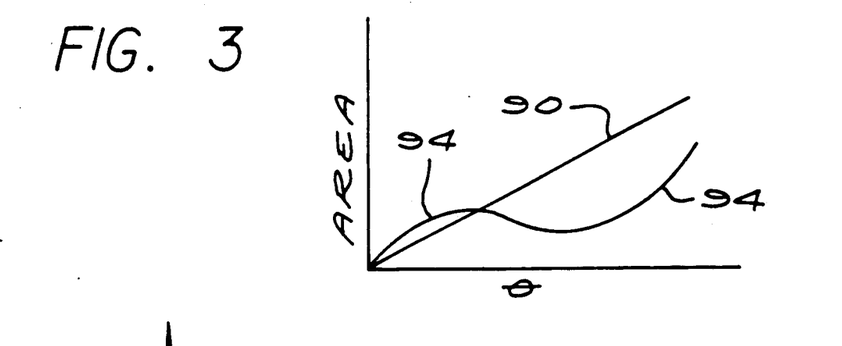
FIG. 3 graphically presents information concerning certain physical parameters of the particularly preferred embodiment of the invention.

FIG. 3 provides a graphical representation of the cross sectional circumferential flow area of scavenge cavity 74 proceeding from end 84 circumferentially through substantially 360° toward scavenge conduit exit 86. As represented by line 90 the area of the cavity 74 increases according to a substantially linear curve. In order to fine tune the circumferential distribution of scavenge air flow at the communication of scavenge flow path 78 with flow path 16, a half-cresent shaped throttling plate 92 is disposed at the juncture of scavenge flow path 78 and scavenge cavity 74. The throttling plate 92 (best seen in FIG. 2) has the effect of changing the effective available scavenge flow area from the line 90 to that represented by line 94 of FIG. 3.

In other words, the half-cresent shaped throttling plate 92 increases the communication of scavenge air flow near end 84 and decreases the flow near scavenge conduit exit 86 in comparison to that which would result from the ordinary scroll shape of cavity 74.

Figure 4:
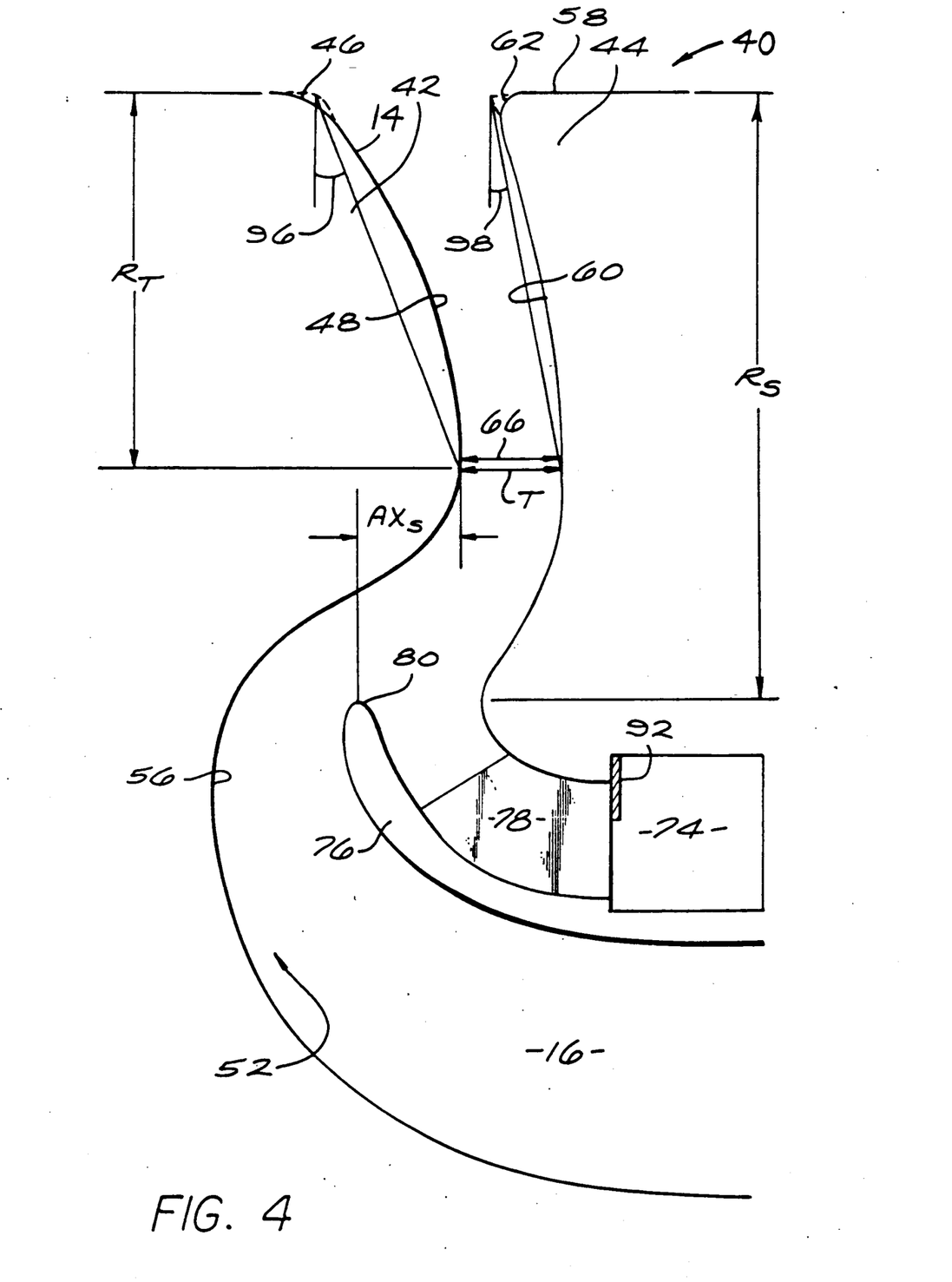
FIG. 4 is similar to FIG. 2 with geometric and dimensional references being set forth.

Viewing now FIG. 4, the same structure seen in FIG. 2 is depicted with the omission of some of the reference numerals and lead lines (except throat arrow 66) in order to make room for dimensional and geometrical references. As seen on FIG. 4, the separator 40 defines a pair of angles, referenced with numerals 96 and 98, with respect to respective radial planes, the first of which defines the axial slope of the flow path 16 from inlet 14 to throat 66 at surface 50 of wall 42. Similarly, the wall 44, at surface 60 defines the angle 98 from prominence 62 to throat 66. Preferably, the angle 96 is 25°, but may acceptably fall into the range from 25° to 40°. Likewise, the angle 98 is preferably 10.5°, but may acceptably fall into the range extending 5° on either side of the preferred angle, that is, from 5.5° to 15.5°.

Also depicted on FIG. 4 are several axial and radial dimensions, including the dimensions AXs, T, Rs, and $R_t$. Using these dimensions, several dimensionless ratios have been determined to be important in achieving an acceptably high separation efficiency for the separator 40. Among these ratios are:

| Ratio | Preferred Value | Range |
|---|---|---|
| $\dfrac{R_s - R_T}{T}$ | 1.90 | 0.85–2.38 |
| $\dfrac{AX_s}{T}$ | 0.34 | 0.34–0.55 |
| $\dfrac{R_T}{T}$ | 3.39 | 3.39–3.84 |

It will be noted in the above that the term T is the axial dimension of the throat 66, and that all of the dimensionless ratios above are stated in terms of T. Further to the above, the applicants have determined that a ratio of the area of scavenge flow path 78 at the radius of splitter line 80 to the area of throat 66 should preferably be 0.64 (hereinafter, scavenge area ratio). However this scavenge area ratio may permissively fall into the range from 0.56 to 0.75.

Having generally considered the structure of the radial inflow particle separator 40, attention may now be directed to its operation. During operation of the turbine engine 10, the compressor rotor portion rotates to induct ambient air via inlet 14 and flow path 16 by communicating a sub-ambient pressure to the latter. The inlet air flows radially inwardly in the flow path 16 between walls 42 and 44, and may include entrained particulate matter. Particulate matter ingested at the inlet 10 may vary both in size and density. In other words, the particulate matter may range from a talc-like dust to sand grains, and even may include occasional small pebbles. As the air flows radially inwardly toward the throat 66, the inherent decrease in flow area results in acceleration of the air flow.

The applicants have determined that an air flow velocity at throat 66 of 0.26 Mach number is preferable. However, the velocity at throat 66 may permissibly be from 0.20 to 0.35 Mach number. In this accelerating air flow the particulate matter acts differently dependent upon its size and density. That is, the dust fine and light weight particulates accelerate substantially with the air flow so that at the throat 66, these particles have a velocity virtually the same as that of the air. On the other hand, the larger and more dense particles do not accelerate as fast as the air, but have a greater momentum tending to carry them in their particular direction of travel.

Once past, or radially inward, of the throat 66, the walls 42 and 44 diverge to increase the fluid flow cross sectional area despite the decreased radial dimension, and to introduce a recurve into the flow path 16 (viewing FIG. 2 arrow 100). The result of the increase of fluid flow cross sectional area is a decrease of air flow velocity at the same time that the air experiences a deviation in flow direction, or reversal of direction in the axial sense. In this curving and decelerating air flow, the dust fine particles will attempt to follow the air flow, but are momentarily prevented from doing so by their own high velocity and momentum. Thus, this dust fine particulate material deviates from flow path 16 and continues generally straight on to enter the scavenge flow path 78 rightwardly of the splitter line 80, viewing FIG. 2. The smaller sand grains which have not achieved parity with the air flow velocity at throat 66 are also much slower to follow the turning air flow and also enter scavenge flow path 78.

On the other hand, larger particulates, such as large sand grains and small pebbles, are not affected nearly to the same extent as the small particles in the accelerating air flow outwardly of throat 66, nor in the decelerating and curving air flow radially inwardly of throat 66. Because of their weight, these particles follow almost a straight line path. Therefore, the separator 40 provides another mechanism for ensuring delivery of these particulates into the scavenge flow path 78. Viewing FIG. 2 once again, it will be noted that a straight radial line from prominence 62 tangent at prominence 50 (represented by arrow 102) falls into the savages flow path 78 well clear of the splitter line 80. The arrow 102 illustrates that, on the basis of a straight line trajectory, a particle entering inlet 14 by grazing, but not rebounding from, prominence 62, and proceeding to graze but not rebound from prominence 50, will travel into the scavenge flow path 78. There may be some slight curvature of the trajectory represented by arrow 102 toward separating line 80 radially inwardly of throat 66 because the air flow (arrow 100) deviates along flow path 16 and is somewhat transverse to the trajectory arrow 102 over a short distance. Nevertheless, the particle will travel into the scavenge flow path 78. The straight line arrow 102 also represents a line of sight radially into the separator 40. Thus, it will be appreciated that the splitter line 80 of splitter 76 is not visible looking into the separator 40. In fact, the cooperating axially opposed and radially spaced prominences 62 and 50 allow only the scavenge flow path 78 to be viewed looking into the separator 40.

Two alternative exemplary particle trajectories into the separator 40 are represented by respective trajectory arrows 104 with particle 106, and arrows 108 with particle 110. Considering first the trajectory of particle 106, it will be seen that the particle enters inlet 14 purely radially, or with a slight axial angulation toward wall 42, to first impact and rebound from the covex surface portion 48 of this wall. Because the surface portion 48 is convex it bounces particle 106 toward wall 44. While irregularities of the particle shape, as well as the material properties of wall 48 affect rebound of the particle 106, the rebound trajectory from surface 48 (arrow 104') can be expected to have about equal angles of incidence and departure. However, the trajectory portion represented by arrow 104' traverses the flow path 16 toward wall 44 such that any curvature introduced into the trajectory by the air flow, which is accelerating somewhat transversely to the path of the particle 106, reduces the angle of incidence at wall 44. Importantly, when the particle 106 does impact the wall 44, the angle of departure (arrow 104") is significantly less than the angle of incidence, because of the concavity of surface portion 60 and the nature of wall 44 itself, as is further explained below. Subsequent to the impact of particle 106 with wall 44, the particle will be on the side of an imaginary capture boundary, represented by dashed line 112, extending radially outwardly from splitter line 80. In other words, because of its shallow angle of rebound from the wall 44, the particle 106 remains close enough to this wall that it inevitably enters the scavenge flow path 78. The capture boundary 112 extends outwardly from line 80 through the flow path 16 to inlet 14 and is positioned axially at each radial station based upon maintaining the same proportion of area on each side with respect to the walls 42, 44 as that which exists at line 80.

The other alternative rebound trajectory is exemplified by arrow 108 and particle 110. In this case, the particle enters inlet 14 radially inwardly and with an axial angulation resulting in impact first with wall 44. As mentioned above with respect to the trajectory of particle 106, the concavity of the surface portion 60 of wall 44 and the nature of the wall itself results in a shallow angle of bounce or departure of particle 110 from the wall 44 (arrow 108'). Thus, the particle 110 proceeds to scavenge flow path 78, either directly or with additional rebounds from wall 44. Importantly, it is seen that the walls 42 and 44 by their convex and concave cooperative curvature, and the low-rebound nature of wall 44 move particles to the capture side of boundary 112, and generally prevent escape of particles from this capture side of the imaginary boundary.

An additional feature in the rebound control of particles in the separator 40 is represented by the recessing of flow distribution vanes 82 significantly radially inwardly of the splitter line 80. Consequently, as particles enter the scavenge flow path 78 any bouncing of particles from the vanes 82 occurs deeply enough in the scavenge flow path 78 that bouncing particles do not escape into flow path 16.

Attention now to FIGS. 1, 5, and 6 will illustrate how the structural elements of the separator are combined to achieve the advantageous results explained above. As is seen also in FIGS. 5 and 6, the scroll-shaped scavenge cavity 74 is defined by the cooperation of a circumferentially extending recess 114 defined by a compressor shroud member 116, and an metallic disk member 118 (best seen in FIG. 6) which is stacked with the shroud member. The shroud member 116 defines a central opening 120 communicating the flow path 16 to compressor rotor portion 20. The disk member 118 is stacked axially at a generally planar back face 122 thereof with the shroud member 116 to sealingly cooperate with sealing surfaces 124 (best seen in FIG. 5) defined thereon to bound scavenge cavity 74.

Importantly, the metallic disk member 118 defines the wall 44 and the surface portions 58, 60, and 68 thereof, including the axial prominence 62 at the boundary of flow path 16 with a silicon carbide loaded epoxy coating. The Applicants have determined that a coating known as RP-3260, available from Ren Plastics, a division of Cila-Geigy, works well for this purpose. The disk 118 defines a stepped central through bore 126 opening to the scavenge cavity 74. Received into the bore 126 is a splitter member 128 which includes the splitter 76, vanes 82, and a ring portion 130 cooperating with the splitter 76 to define scavenge flow path 78. The splitter member 128 includes a smaller diameter outer surface portion 128' and a larger diameter outer surface portion 128" at ring portion 130. Portion 128' is received into bore 120 of shroud member 116, while portion 128" seats in the stepped bore 120 of disk 118. Consequently, the scavenge flow path 78 defined between splitter 76 and ring portion 130 proceeds radially inwardly in the splitter member 128, and radially inwardly of the ring portion 130 opens axially to the scavenge cavity. The splitter member 128 defines a central bore 132 which communicates through the central opening 120 of the compressor shroud member 116. The bore 132 communicates flow path 16 therethrough.

In axially spaced relation with the disk 118 and splitter member 128 is a metallic disk member 134 defining wall 42. The applicants have found that the member 134 may be made of aluminum with a hard anodize coating on the surfaces 46-56 to resist abrasion by the particulates entering inlet 14.

The applicants have found by testing a particle separator as herein described that the wall 44 defined by disk 118 very favorably resists abrasion by particulates in the air flow. Surprisingly, the epoxy and silicon carbide ceramic surface 60 has been found to result in particles incident thereon with an acute angle bouncing off with a more acute angle. This favorable boundary rebound control of particulates was explained in connection with FIG. 2 and particles 106, 110. By way of analogy only, the difference between particle rebound from the smooth ceramic surface 60 as opposed to a softer surface, may be likened to the bounce of a tennis ball from a hard court as opposed to a clay court. On a clay court a tennis ball tends to grip the surface and convert part of its velocity energy to height of bounce. On the other hand, a hard-surface tennis court causes a tennis ball to skitter and to bounce lower without converting velocity to bounce height. Similarly, applicants believe that the abrasion resistance and low particle rebound angle provided by the surface 60 of ceramic disk 118 both result from the hardness and smoothness of the ceramic coating material. Particles incident on this surface tend to bounce off with a lower angle than their angle of incidence.

The applicants have built and tested particle separators according to the preferred embodiment herein disclosed. These test units achieved 88.2% separation efficiency with MIL5007-C spec. sand, and 88.7% with A.C. course particulates. As can be seen by comparing the performance data set out earlier for axial flow particle separators, this inventive radial flow separator compares very well. However, the present radial flow particle separator packages much better with essential turbine engines structures than do the axial flow devices. Also, the inventive particle separators were successful in separating nuts, bolts, small wire pieces, and mechanic's tools, from the inflow air stream to the turbine engine. while some of these foreign objects are too large to be scavenged from the engine, they were prevented from passing to the compressor and causing engine damage.

While the present invention has been depicted and described by reference to a particularly preferred embodiment of the invention, such reference does not imply a limitation on the invention, and no such limitation is to be inferred. The invention is intended to be limited only by the spirit and scope of the appended claims, which provide additional definition of the invention.

What is claimed is:

1. A radial inflow particle separator comprising an axially and radially spaced apart pair of walls cooperatively defining therebetween an annular air flow path leading radially inwardly from an ambient inlet and then turning axially to an outlet, an annular radially and axially extending splitter member interposing axially and radially between said pair of walls substantially at the turning of said flow path and cooperating with one of said pair of walls to separate from said flow path a scavenge flow path having an annular inlet confronting said ambient inlet, said pair of walls each including a respective annular axially extending prominence spaced radially from the prominence of the other of said pair of walls, and said axial prominences cooperating to bound a line of sight radially into said particle separator, said line of sight at its radially inner limit being entirely within said scavenge flow path inlet.

2. The invention of claim 1 wherein said splitter member includes an annular splitter line surface portion whereat air flow in said flow path and air flow in said scavenge flow path separate, said line of sight passing into said scavenge flow path axially spaced from said splitter line surface, whereby said splitter line surface is not visible looking radially into said particle separator.

3. The invention of claim 2 wherein said one walls defines its said respective axial prominence at a radially outer extent of said wall, and is axially concave radially inwardly of said prominence.

4. The invention of claim 3 wherein the other of said pair of walls defines its said respective axial prominence radially inwardly of said prominence said one wall, and radially outwardly of said prominence said other wall is axially convex in curvature.

5. The invention of claim 4 wherein said other wall radially inwardly of said axial prominence is also axially convex in curvature to lead radially inwardly into an axially disposed recess.

6. The invention of claim 5 wherein said splitter member is disposed axially in said axially disposed recess in axially spaced relation with said other wall.

7. The invention of claim 1 wherein said pair of walls cooperate to define an axial recurve for said flow path so that the latter leads radially inwardly from said ambient inlet and in a first axial direction while curving toward a pure radial direction radially outwardly of said splitter member, said flow path then proceeding radially inwardly and in the opposite axial direction past and around said splitter member, radially inwardly of the radially outer extent of said splitter member said flow path proceeding radially inwardly while curving again in said first axial direction to proceed axially to said outlet.

8. The invention of claim 1 wherein said pairs of walls cooperate radially outwardly of said splitter member and scavenge flow path inlet to define an annular axially extending throat of minimum cross sectional flow area for said flow path.

9. The invention of claim 8 wherein the air flow velocity at said throat is selected to fall in the range from Mach 0.20 to Mach 0.35 with a design air flow rate through said separator.

10. The invention of claim 9 wherein said air flow velocity at said throat in preferably Mach 0.26 at said design air flow rate.

11. The invention of claim 8 wherein said one wall with respect to a radial plane defines a respective angle from said respective axial prominence to said throat as the latter is bounded by said one wall, said angle falling in the range from 5.5 degrees to and including 15.5 degrees.

12. The invention of claim 11 wherein said respective angle defined by said one wall is preferably 10.5 degrees.

13. The invention of claim 8 wherein the other said pair of walls with respect to a radial plane defines a respective angle from said throat as the latter is bounded by said other wall to the bounding of said ambient inlet by said other wall, said respective angle being in the range from 25 degrees to and including 40 degrees.

14. The invention of claim 13 wherein said respective angle defined by said other wall is preferably 25 degrees.

15. The invention of claim 8 wherein said annular throat has both a certain axial dimension (T) between said pair of walls and a determined cross sectional flow area ($A_T$) for radially inward flow of air therethrough, said throat being spaced inwardly a radial dimension ($R_T$) with respect to said ambient inlet, the ratio of $R_T$ divided by T falling in the range from 3.39 to and including 3.84.

16. The invention of claim 15 wherein the ratio $R_T$ divided by T is preferably 3.39.

17. The invention of claim 15 wherein said scavenge flow path inlet has an area $A_S$, the ratio of $A_S$ divided by $A_T$ falling the the range from 0.56 to 0.75 inclusive.

18. The invention of claim 17 wherein the ratio of $A_S$ divided by $A_T$ is preferably 0.64.

19. The invention of claim 15 wherein said splitter member at the radially outer extent thereof is spaced axially from said respect axial prominence of said other wall of said pair of walls by a dimension $AX_S$ and is spaced radially inwardly of said ambient inlet a dimension $R_S$, the ratio of $AX_S$ divided by T falling in the range of 0.34 to 0.55 inclusive.

20. The invention of claim 19 wherein the ratio of $AX_S$ divided by T is preferably 0.34.

21. The invention of claim 19 wherein the ratio of $R_S$ minus $R_T$ all divided by T is in the range from 0.85 to 2.38 inclusive.

22. The invention of claim 21 wherein the ratio of $R_S$ minus $R_T$ all divided by T is preferably 1.90.

23. The invention of claim 1 wherein said one wall is substantially defined by an annular disk-like member extending radially outwardly from said splitter member to said ambient inlet.

24. The invention of claim 1 wherein said particle separator further includes disposed in said scavenge air flow path an annular array of air flow turning vanes having a landing edge confronting said scavenge inlet, said annular array of turning vanes being spaced radially inwardly of said scavenge inlet a dimension sufficient to substantially prevent particles incident upon said turning vanes from bouncing therefrom back into said air flow path.

25. The invention of claim 1 further including said scavenge air flow path leading to a circumferentially extending scavenge cavity, scavenge fan means for withdrawing from said scavenge cavity a predetermined scavenge air flow, and means controlling communication of said scavenge inlet with said scavenge for means via said scavenge cavity to achieve substantially uniform circumferential distribution of said scavenge air flow at said scavenge inlet.

26. The invention of claim 26 wherein said scavenge air flow communication control means includes a semi-crescent shaped throttling plate disposed between said scavenge flow path and said scavenge cavity.

27. A radial inflow particle separator comprising an axially and radially spaced apart pair of walls cooperating to bound an air flow path extending radially inwardly from an ambient inlet and curving to extend axially to an outlet, said particle separator including a disk-like ceramic boundary member defining a radially extending portion of one of said walls and leading radially inwardly to a scavenge inlet for receiving particulate matter, said ceramic boundary member providing an angle of rebound which is less than the angle of incidence of particulate matter contacting said member, whereby particulate matter incident upon said ceramic boundary member tends to remain close to said one wall and to proceed into said scavenge inlet.

28. A method of separating particulate matter entrained in an air flow to provide therefrom a minor fractional air flow laden with the particulate matter and a major fractional air flow substantially free of said particulate matter; said method comprising the steps of; accelerating said air flow and entrained particulate matter radially inwardly between an axially spaced pair of walls, passing the accelerated air flow and particulate matter through an annular throat at a velocity in the range from 0.20 Mach to 0.35 Mach inclusive, flowing said particulate matter and a minor fractional air flow into a scavenge inlet in line-of-sight relation with said inwardly accelerating air flow and throat, and flowing said major fractional air flow along a flow path deviating axially out of line-of-sight relation with said throat simultaneously with deceleration of said major fractional air flow.

29. The method of claim 28 further including the steps of rebounding from at least one of said pair of spaced pair of walls those particulates having a sufficiently great ratio of mass to volume that they do not closely follow accelerations and decelerations of said air flow, and utilizing as at least a portion of said one wall an annular ceramic boundary member leading radially inwardly to said scavenge inlet, and rebounding said particulates from said one wall at an angle less than their angle of incidence to retain said particulates close to said one wall for receipt into said scavenge inlet, whereby rebound and trajectory control of said particulates is the operative mechanism for removing same from the major fractional air flow.

30. The method of claim 29 further including the steps of utilizing as the other of said pair of walls a member configured to pressure or increase through rebound therewith the angulation of particulates incident thereon toward said one wall, whereby particulates incident first upon said other wall are rebounded toward said one wall and subsequently are retained close thereto for receipt into said scavenge inlet.

31. Radial inflow particle separation apparatus associating with a turbine engine and removing air-bourne particulates from an ambient air stream to thereby provide an engine inlet air stream substantially free of said particulates, said particle separation apparatus comprising:

a pair of annular wall members axially spaced apart to cooperatively define both an annular ambient inlet and flow path proceeding radially inwardly between said pair of walls, a first of said pair of walls defining a respective annular radially outer axial prominence at said ambient inlet and a concave radially inwardly extending first surface portion slanting in a first axial direction below said prominence to bond said ambient flow path;

a second of said pair of walls defining a respective convex annular radially outer second surface portion cooperating with said first surface portion to define said ambient inlet and slanting in said first axial direction to bond said ambient flow path, said second surface portion defining a respective second annular radially inner axial prominence spaced inwardly of and extending axially in opposition to said first axial prominence, said second surface portion cooperating with said first surface portion generally at said second axial prominence to define an annular throat for said particle separation apparatus;

radially inwardly of said throat said first surface portion slanting opposite said first axial direction and joining with a third surface portion defined by said first wall member, said third surface portion being convey to proceed radially inwardly from said first surface portion while curving substantially to the first axial direction;

an annular splitter member in axial and radially inwardly spaced relation with said first wall member at said third surface portion to cooperatively define both a radially outwardly disposed annular scavenge inlet in general radial congruence with said throat and a scavenge flow path proceeding from said scavenge inlet radially inwardly while curving substantially to the first axial direction;

radially inwardly of said throat said second surface portion curving toward the opposite axial direction to diverge from said first surface portion and to define a recess extending axially in said opposite axial direction below said second axial prominence, at said recess said second wall member defining a forth concave surface portion joining with said second surface portion and extending radially inwardly while curving substantially to the first axial direction in axial and radially inwardly spaced relation with said splitter member to define an engine inlet flow path;

said splitter member being received into said axial recess so that said scavenge inlet at the extent thereof defined by said splitter member is spaced axially opposite said first direction with respect to said throat, and a line surface portion of said splitter member whereat air flow into said scavenge inlet separates from air flow into said engine inlet flow path is hidden from a radially inward line of sight by said axial prominences;

whereby particulates ingested into said ambient air inlet proceed radially inwardly through said throat and into said scavenge inlet along with a scavenge fractional flow of air, said engine inlet air stream turning into said axial recess substantially free of particulates and proceeding to said turbine engine via said engine inlet flow path.

32. The invention of claim 31 wherein said throat has both an axial dimension (T), and an area ($A_T$), the radial dimension of said throat inwardly of said ambient inlet having a dimension ($R_T$), while said splitter member has both a radial dimension ($R_S$) inwardly of said ambient inlet and an axial dimension ($AX_S$) determined from the axial prominence of said second wall member axially to said line surface portion of said splitter member, said scavange inlet having an area $A_S$ the following relations existing among the valves $A_T$, $R_T$, $R_S$ and $AX_S$:

| Dimensionless Ratio | Range (inclusive) |
| --- | --- |
| $\dfrac{R_s - R_T}{T}$ | 0.85–2.38 |
| $\dfrac{AX_s}{T}$ | 0.34–0.55 |
| $\dfrac{A_s}{A_T}$ | 0.56–0.75 |
| $\dfrac{R_T}{T}$ | 3.39–3.84 |

33. The invention of claim 32 wherein the ratio of $R_S$ minus $R_T$ all divided by T is 1.9.

34. The invention of claim 32 wherein the ratio $AX_S$ divided by T is 0.34.

35. The invention of claim 32 wherein the ratio $A_S$ divided by $A_T$ is 0.64.

36. The invention of claim 32 wherein the ratio $R_T$ divided by T is 3.39.

37. The invention of claim 31 wherein said first wall member includes a disk-like ceramic boundary member defining at least a part of said first annular surface portion, said ceramic boundary member providing a comparatively decreased angle of departure in comparison with the angle of incidence of particulates bouncing from said first surface portion.

38. The invention of claim 31 further including fan means for withdrawing a scavenge air flow from said scavenge flow path, and flow communication means effective at said scavenge flow path for achieving substantially uniform circumferential distribution of said scavenge air flow into said scavenge inlet.

39. The invention of claim 38 wherein said flow communication means includes a semi-crescent shaped throttling plate member at said scavenge flow path.

40. The invention of claim 31 further including in said scavenge flow path a circumferentially arrayed plurality of scavenge flow turning vanes, said flow turning vanes having a leading edge confronting and spaced radially inwardly of said scavenge toward a circumferential direction.

* * * * *